(12) United States Patent
Jacobsen

(10) Patent No.: US 10,053,233 B2
(45) Date of Patent: Aug. 21, 2018

(54) DEVICE AND A METHOD FOR AUTOMATIC DETECTION OF WHETHER AN ITEM IS CORRECTLY ROUTED

(71) Applicant: LYNGSOE SYSTEMS A/S, Aars (DK)

(72) Inventor: Klaus Holst Jacobsen, Aars (DK)

(73) Assignee: LYNGSOE SYSTEMS A/S (DK)

( * ) Notice: Subject to any disclaimer, the term of this patent is extended or adjusted under 35 U.S.C. 154(b) by 0 days.

(21) Appl. No.: 15/548,441

(22) PCT Filed: Feb. 6, 2015

(86) PCT No.: PCT/DK2015/050026
§ 371 (c)(1),
(2) Date: Aug. 3, 2017

(87) PCT Pub. No.: WO2016/124199
PCT Pub. Date: Aug. 11, 2016

(65) Prior Publication Data
US 2018/0022473 A1    Jan. 25, 2018

(51) Int. Cl.
*G08B 13/14*    (2006.01)
*B64F 1/36*    (2017.01)
(Continued)

(52) U.S. Cl.
CPC .............. *B64F 1/368* (2013.01); *B65G 43/08* (2013.01); *G06K 7/10316* (2013.01); *B65G 2201/0264* (2013.01)

(58) Field of Classification Search
CPC ........... G08B 13/14; G08B 1/08; B65G 43/08
(Continued)

(56) References Cited

U.S. PATENT DOCUMENTS 6,222,452 B1    4/2001    Ahlstrom et al.
6,304,183 B1 *  10/2001    Causey .............. G08B 21/0216
                                                 340/539.1
(Continued)

FOREIGN PATENT DOCUMENTS

DE    102011078191 A1    1/2013
EP         1070664 A2    1/2001
(Continued)

OTHER PUBLICATIONS

International Search Report—PCT/DK2015/050026; 3 pgs.
Written Opinion—PCT/DK2015/050026; 4 pgs.

*Primary Examiner* — James R Bidwell
(74) *Attorney, Agent, or Firm* — Schmeiser, Olsen & Watts, LLP

(57) ABSTRACT

A device for automatic detection of whether an item is correctly routed is provided, the item including at least one radio frequency tag, wherein the device includes an RF communication mechanism for receiving at least one reading from the RF tag, the device being adapted to be arranged at a read point in proximity of the conveying mechanism, which conveying mechanism is operable to transport the item towards a destination, wherein the device is configured to extract identification and/or destination information from the reading received from the item on the conveying mechanism crossing past the device and to verify whether the item is correctly routed. Also, provided is a method for automatic detection of whether an item is correctly routed.

8 Claims, 4 Drawing Sheets

Figure 1:
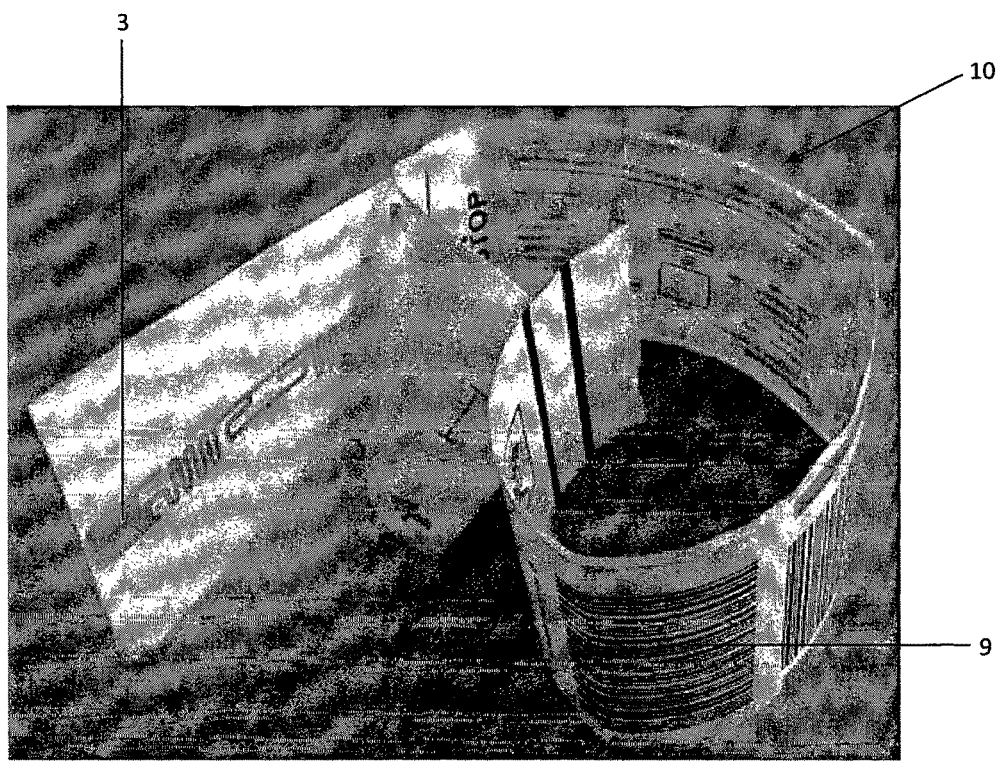

(51) Int. Cl.
*B65G 43/08* (2006.01)
*G06K 7/10* (2006.01)

(58) Field of Classification Search
USPC ......... 340/572.1, 568.1, 572.7, 572.8, 686.6, 340/686.5
See application file for complete search history.

(56) References Cited

U.S. PATENT DOCUMENTS

| | | |
|---|---|---|
| 6,580,046 B1 | 6/2003 | Koini et al. |
| 6,721,391 B2 | 4/2004 | McClelland |
| 7,030,760 B1 | 4/2006 | Brown |
| 7,139,406 B2 | 11/2006 | McClelland |
| 7,195,159 B2 | 3/2007 | Sloan et al. |
| 7,353,955 B2 | 4/2008 | Edwards |
| 7,503,457 B2 | 3/2009 | Koren |
| 7,626,505 B2 * | 12/2009 | August ................... G06K 17/00 340/568.1 |
| 7,656,273 B2 | 2/2010 | Ehrman et al. |
| 7,667,573 B2 | 2/2010 | Ehrman et al. |
| 7,683,760 B2 | 3/2010 | Ehrman et al. |
| 7,786,844 B2 | 8/2010 | Ehrman et al. |
| 8,031,903 B2 | 10/2011 | Paresi et al. |
| 8,120,467 B2 | 2/2012 | Ehrman et al. |
| 8,237,567 B2 * | 8/2012 | Koo ....................... G06Q 50/28 340/572.1 |
| 8,258,926 B2 | 9/2012 | Bayer |
| 8,390,456 B2 * | 3/2013 | Puleston .............. G06K 7/0008 340/10.1 |
| 8,622,298 B2 | 1/2014 | Huber |
| 8,952,813 B2 * | 2/2015 | Boss ................... G06Q 10/0832 340/10.1 |
| 9,129,167 B2 | 9/2015 | Motley, III et al. |
| 9,195,865 B2 | 11/2015 | Motley, III et al. |
| 9,424,723 B2 * | 8/2016 | Dubarry ................... A45C 5/03 |
| 9,817,113 B2 * | 11/2017 | Loftis ..................... G01S 13/88 |
| 2002/0176531 A1 | 11/2002 | McClelland et al. |
| 2006/0220857 A1 * | 10/2006 | August .................. G06K 17/00 340/572.1 |
| 2008/0122626 A1 | 5/2008 | Ehrman et al. |
| 2010/0040440 A1 | 2/2010 | Lessmann |
| 2010/0076796 A1 * | 3/2010 | Klein ..................... B64F 1/368 705/5 |
| 2014/0168374 A1 | 6/2014 | Bunkers |
| 2015/0360258 A1 | 12/2015 | Dadyala |

FOREIGN PATENT DOCUMENTS

| | | |
|---|---|---|
| EP | 2502186 A1 | 9/2012 |
| EP | 2734447 A1 | 5/2014 |
| WO | WO2014161556 A1 | 10/2014 |
| WO | WO2015155087 A1 | 10/2015 |
| WO | WO2015169584 A1 | 11/2015 |

* cited by examiner

DEVICE AND A METHOD FOR AUTOMATIC DETECTION OF WHETHER AN ITEM IS CORRECTLY ROUTED

CROSS-REFERENCE TO RELATED APPLICATIONS

This application claims priority to PCT Application No. PCT/DK2015/050026 having a filing date of Feb. 6, 2015, the entire contents of which is hereby incorporated by reference.

FIELD OF TECHNOLOGY

The following relates to the technical field of item registration, particularly to routing of registered items.

BACKGROUND

In an exemplary airport scenario, where suitcases shall be routed to a flight, a worker, before loading a suitcase on a conveyor belt directed towards the baggage compartment of an airplane, manually scans with an optical hand scanner the label attached to the suitcase. The hand scanner may wirelessly communicate with a server to retrieve the destination of the suitcase. In case the latter is not directed to that flight and thereby it has been wrongly routed, the hand scanner warns the worker to remove that suitcase from the conveyor belt. This operation is very time consuming, since the worker shall first find the label, which may not always be so conveniently placed (e.g., underneath the suitcase), and then manually scan each and every suitcase before loading it on the conveyor belt. Naturally, every now and then, the worker will forget to scan a suitcase. Note also that, since there is the need of a dedicated worker to operate the hand scanner, the labour cost is considerably high.

Hence, there is a long-felt need in the technical field of registration and routing of items of overcoming the above-mentioned drawbacks of the state-of-the-art solutions.

SUMMARY

An aspect relates to an improvement to the state-of-the-art. The second aspect of the invention is to solve the aforementioned drawbacks of the known art, i.e., by providing an automatic solution that enables speeding up the operation of routing validation while avoiding overloading workers.

The aforementioned aspects of the embodiments of the invention are achieved by a device for automatic detection of whether an item (e.g., a suitcase, a bag, a package, etc.) is correctly routed (e.g., towards the correct flight), said item including at least one radio frequency (RF) tag (e.g., a self-adhesive label, embedding an RFID tag, fastened at the handle of a suitcase), wherein the device comprises an RF communication means or mechanism (e.g., an RF antenna such as an RFID antenna and an RF reader such as an RFID reader) for receiving at least one reading from (and/or requesting at least one reading from) the RF tag, said device being adapted to be arranged at a read point in proximity of the conveying means or mechanism (e.g., the device can be mounted on a handrail on the side of a conveyor belt), which conveying means or mechanism (e.g., a conveyor belt, a roller conveyor, a chain conveyor, etc.) is operable to transport the item towards a destination (e.g., the baggage compartment of an airplane), wherein the device is configured to extract identification and/or destination information from the reading received from the item on the conveying means or mechanism crossing past the device and to verify whether the item is correctly routed (e.g., by checking on an internal or external database whether the destination information coded in the RF tag matches the destination of the conveying means or mechanism to which the device is associated to—in general, any check necessary to approve that the item is indeed correctly routed may be carried out).

Herein, "RFID" is referred to any technology that uses RF signals for communication and/or identification purposes such as UHFGen2.

Thanks to RF communications between the device of embodiments of the invention and the item, the tag can be automatically scanned without neither human intervention nor line-of-sight conditions between the tag and the device (which is instead essential in case of an optical hand scanner). Consequently, a much more speedy routing validation and a less cumbersome operation, which requires less manual labour and thereby saves costs, are achieved.

In an advantageous embodiment of the invention, the device further comprises a positioning means or mechanism (e.g., a GPS receiver) for determining a position of the device. Being able to determine its position (e.g., which parking stand it is parked at, thus identifying the flight currently being loaded), the device is enabled to compare the destination of the item with respect to its position and thereby to detect a routing error.

In an advantageous embodiment of the invention, the device further comprises a connecting means or mechanism for connecting the device to a controller associated to the conveying means or mechanism, so as to stop the conveying means or mechanism whenever a routing error is detected. Thereby, it is ensured that no error is ignored, thus making embodiments of the invention an automated solution that enables avoiding human errors.

In an advantageous embodiment of the invention, the device further comprises a warning means or mechanism for warning a user of the device whenever a routing error is detected.

Also, the aforementioned aspects of the embodiments of the invention are achieved by a method for automatic detection of whether an item is correctly routed, said item including at least one radio frequency (RF) tag, wherein the method comprises:

providing a device as described above;

arranging the device at a read point in proximity of the conveying means or mechanism;

extracting at the device identification and/or destination information from at least one reading received from the item on the conveying means or mechanism crossing past the device; and verifying at the device whether the item is correctly routed.

In an advantageous embodiment of the invention, the method further comprises determining a position of the device.

In an advantageous embodiment of the invention, the method further comprises connecting the device to a controller associated to the conveying means or mechanism and stopping the conveying means or mechanism whenever a routing error is detected.

In an advantageous embodiment of the invention, the method further comprises activating a warning means or mechanism for warning a user of the device whenever a routing error is detected.

Note that the steps of the method do not necessarily need to be carried out in the order described above but may also be performed in a different order and/or simultaneously.

Note that all the aforementioned advantages of the device are also met by the method described above.

BRIEF DESCRIPTION

Figure 2:
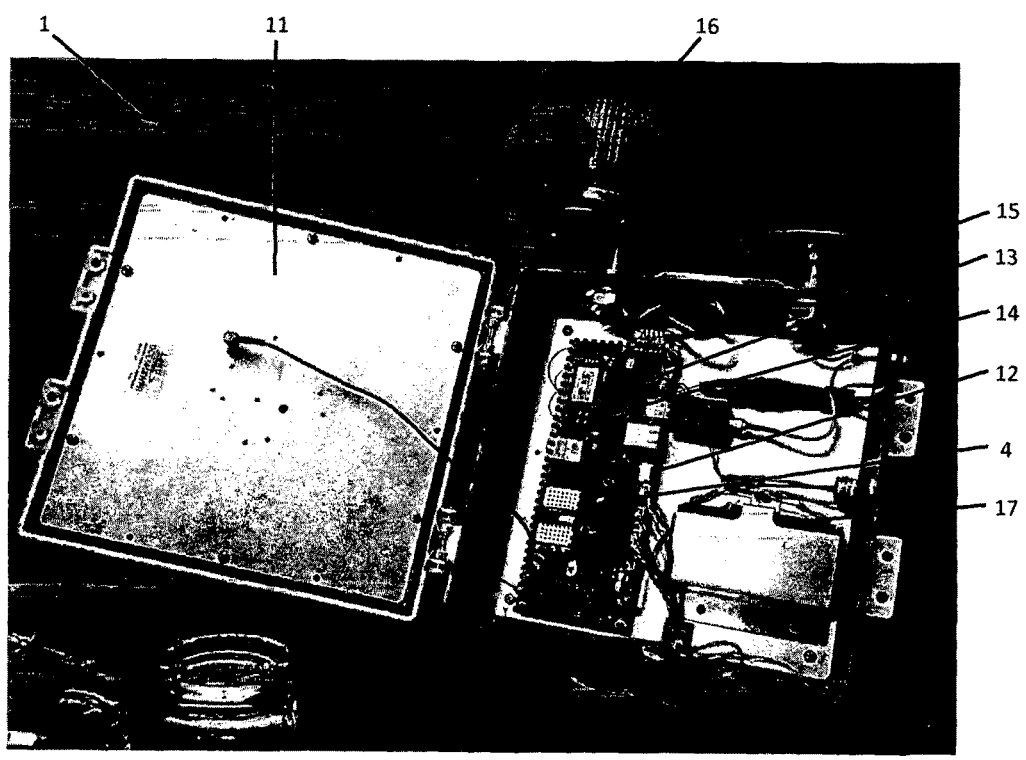
Figure 3:
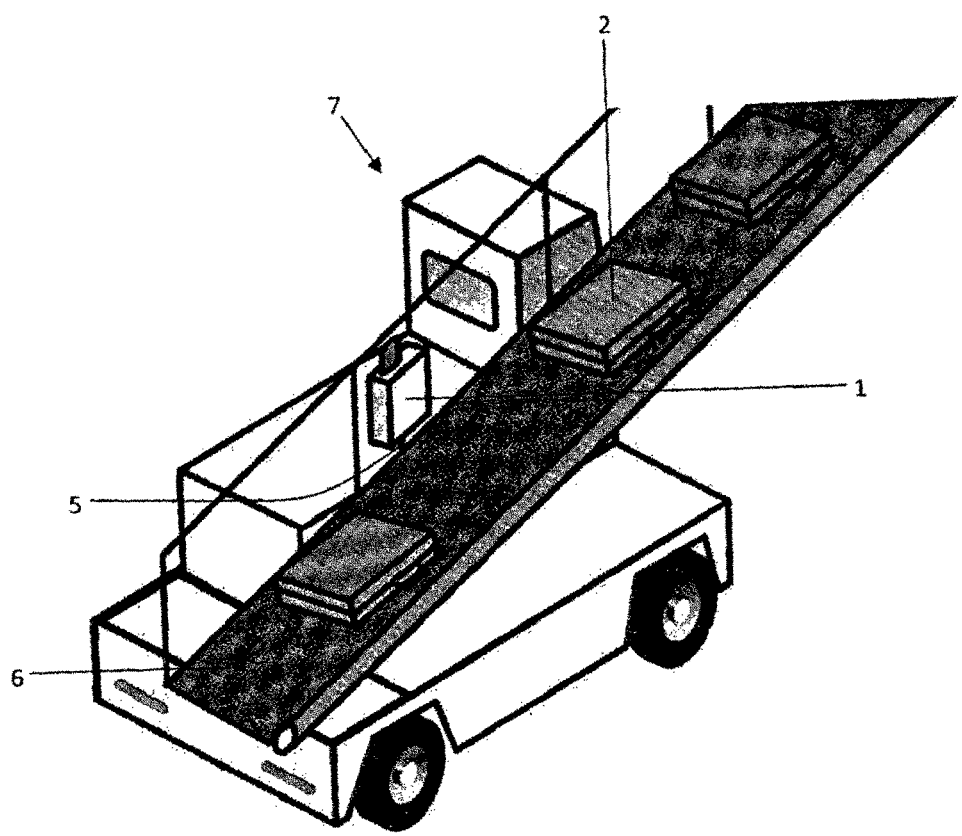

Some of the embodiments will be described in detail, with reference to the following figures, wherein like designations denote like members, wherein:

FIG. 1: A self-adhesive label including an RFID tag;

FIG. 2: A device for automatic detection of whether an item is correctly routed;

FIG. 3: A device according to embodiments of the invention used in a belt loader; and FIG. 4: A method for automatic detection of whether an item is correctly routed.

NOTATIONS

1: Device.
2: Suitcase.
3: RFID tag.
4: RFID reader.
5: Read point.
6: Conveyor belt.
7: Belt loader.
9: Barcode.
10: Label.
11: Lid.
12: Motherboard.
13: PC.
14: 3G modem/antenna unit.
15: Horn
16: Lamp.
17: Battery.

DETAILED DESCRIPTION

FIG. 1 shows a self-adhesive label 10 including an RFID tag 3, wherein the label 10 is fastened to a suitcase 2 (i.e., an item 2) (ref. FIG. 3) of a passenger.

The printer at the check-in codes the relevant information in the RFID tag 3, which is printed together and embedded in the label 10 to apply to the suitcase 2. The 10 digits code, which is encoded in the barcode 9 on the label 10, is also encoded in the RFID tag 3 via the RFID antenna at the printer. Thanks to that 10 digits code, it is possible to retrieve the travel information (e.g., the flight number, etc.) of the passenger from a database. Alternatively, it is also possible to store the travel information directly in the RFID tag 3, so that the need for storing the travel information in a database is avoided.

FIG. 2 shows a device 1 for automatic detection of whether a suitcase 2 is correctly routed. The device 1 comprises: an RFID antenna (i.e., a first element of a communication means or mechanism 4) (not visible) embedded in the lid 11 of the device 1, a motherboard 12, an RFID reader 4 (i.e., a second element of the communication means or mechanism 4), a PC 13, a 3G modem/antenna unit 14 (it may also be a WiFi modem/antenna unit, and the antenna may also be used for receiving GPS signals), a Bluetooth port, I/O (i.e., a connecting means or mechanism), a horn 15 (i.e., a first element of a warning means or mechanism), a lamp 16 (i.e., a second element of the warning means or mechanism) and a battery 17.

FIG. 3 shows the device 1 mounted on a read point 5 on the side of a conveyor belt 6 of a belt loader 7 (i.e., a transportable conveyor belt 6, which is driven under an airplane and which is used to load the suitcases 2 in the baggage compartment of the airplane). The device 1 will then scan any suitcase 2 that runs past in front of its lid 11 and check if the suitcase 2 is in fact directed to that flight by communicating via the 3G unit 14 to an external server for verifying the data. Consequently, if the suitcase 2 should not be directed to that flight and/or the passenger has not boarded and/or the suitcase has been properly screened, etc., the lamp 16 will light up (e.g., in red), the horn 15 will sound and, thanks to the I/O, the conveyor belt 6 of the belt loader 7 will be stopped. The worker unloading the baggage cart onto the conveyor belt will watch out for the light and/or the sound identifying misrouted suitcases and will then remove the suitcase 2 positioned in front of the device 1.

Advantageously, thanks to Bluetooth, the device 1 may also communicate with a hand scanner carried by a worker at the belt loader 7 (instead of directly communicating with the server via the 3G unit 14), which checks on the server if the suitcase 2 read by the device 1 is in fact directed to that flight or not. If not, the device 1 will then react as already described above.

Figure 4:
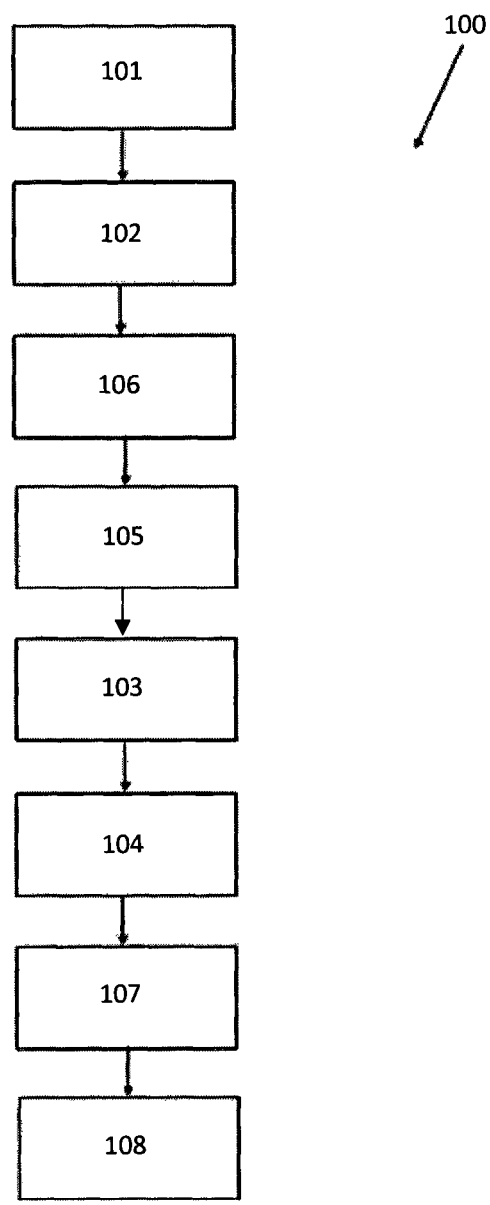

FIG. 4 shows a method 100 for automatic detection of whether an item 2 is correctly routed, said item 2 including at least one radio frequency (RF) tag 3, wherein the method 100 comprises:

providing 101 a device 1 as described above;

arranging 102 the device 1 at a read point 5 in proximity of the conveying means or mechanism 6;

connecting 106 the device 1 to a controller associated to the conveying means or mechanism 6;

determining 105 a position of the device 1;

extracting 103 identification and/or destination information from at least one reading received from the item 2 on the conveying means or mechanism 6 crossing past the device 1;

verifying 104 whether the item 2 is correctly routed;

stopping 107 the conveying means or mechanism 6 whenever a routing error is detected; and activating 108 a warning means or mechanism 15, 16 for warning a user of the device 1 whenever a routing error is detected.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A device for automatic detection of whether an item on an airport conveyor is correctly routed, said item including at least one RFID tag, wherein the device comprises an RFID antenna, and an RFID reader, the RFID reader being configured for receiving at least one reading from the tag via the antenna, wherein said device is adapted to be arranged at a read point in proximity of a conveyor, which conveyor is operable to transport the item towards a destination, wherein the device is configured for extracting identification or destination information or both from the reading received from the item on the conveyor crossing past the device and for verifying whether the item is correctly routed, and wherein the device further comprises a GPS receiver for determining a position of the device and for identifying a parking stand in the airport and identifying an airplane currently being loaded by the conveyor; and for checking on the basis of the reading whether the item is correctly routed.

2. The device according to claim 1, wherein the device comprises a casing inside which there is provided the RFID antenna, the RFID reader, and the GPS receiver; wherein the casing further comprises a connector for functional connecting the device to a controller of the conveyor, and wherein the device is configured for automatically stopping the conveyor whenever a routing error is detected.

3. The device according to claim 2, wherein the device further comprises a lamp or a horn or both as a warning mechanism for warning a user of the device whenever a routing error is detected.

4. A method for automatic detection by a device whether an item on an airport conveyor is correctly routed, said item including at least one RFID tag,
wherein the device comprises
an RFID antenna and
an RFID reader, the RFID reader being configured for receiving at least one reading from the tag via the antenna,
wherein said device is adapted to be arranged at a read point in proximity of the conveyor, which conveyor is operable to transport the item towards a destination, wherein the device is configured for extracting identification or destination information or both from the reading received from the item on the conveyor crossing past the device and for verifying whether the item is correctly routed;
wherein the method comprises:
arranging the device at a read point in proximity of the conveyor;
placing the item with the tag on the conveyor and crossing the item by the conveyor past the device;
by the reader receiving at least one reading from the tag via the antenna,
by the device extracting identification or destination information or both from the at least one reading received from the tag while the item is crossing past the device;
by the device verifying whether the item is correctly routed or whether there is a routing error; and
wherein the device comprises a GPS receiver for determining a position of the device, and the method further comprises determining a GPS position of the device, from the GPS position identifying a parking stand in the airport and identifying a flight currently being loaded by the conveyor; checking on the basis of the reading whether the item is correctly routed.

5. The method according to claim 4, wherein the device comprises a casing inside which there is provided the RFID antenna, the RFID reader, and the GPS receiver; and wherein the conveyor is a conveyor belt as part of a belt loader vehicle; wherein the method comprises arranging the casing of the device on the vehicle at a read point on the side of the conveyor belt.

6. The method according to claim 5, wherein the item is a suitcase, or a bag, or a package; wherein the destination is a baggage compartment of an airplane; wherein the method further comprises driving the belt loader vehicle under an airplane and loading the suitcase, bag or package into the baggage compartment of the airplane by the conveyor belt only if the suitcase, bag or package is verified as correctly routed.

7. The method according to claim 6, wherein the casing comprises a connector for functional connection of the device to a controller of the conveyor, and wherein the device is configured for automatically stopping the conveyor via the connector whenever a routing error is detected; wherein the method further comprises connecting the connector to the controller of the conveyor and, during checking of the routing of the item, automatically causing the conveyor to stop whenever a routing error is detected by the device.

8. The method according to claim 7, wherein the device comprises a lamp or a horn or both as a warning means, wherein the method further comprises activating the lamp or the horn or both for warning a user of the device whenever a routing error is detected.

* * * * *